Figure 1:
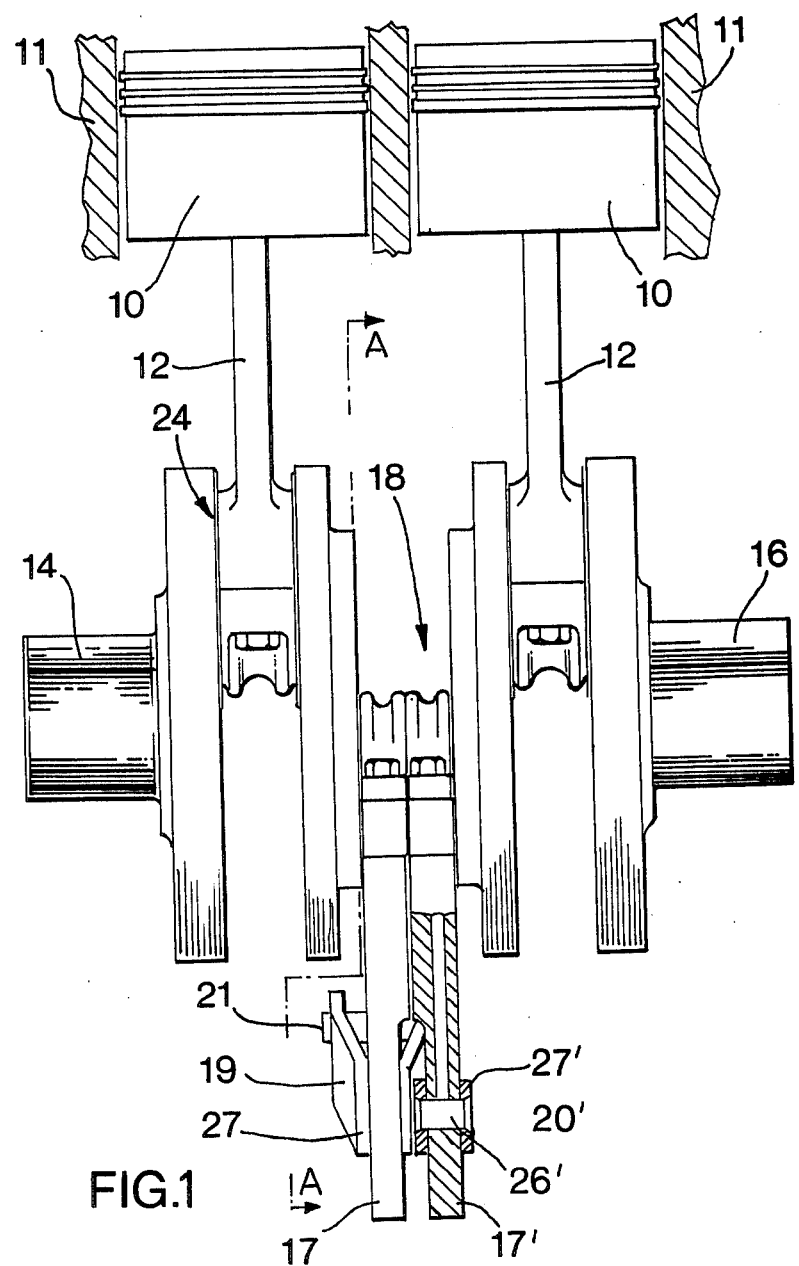

United States Patent [19]

Morton

[11] Patent Number: 4,481,918
[45] Date of Patent: Nov. 13, 1984

[54] MEANS FOR REDUCING VIBRATION IN RECIPROCATING ENGINES

[75] Inventor: Paul G. Morton, Wightwick, England

[73] Assignee: Triumph Motorcycles (Meriden) Limited, Allesley, England

[21] Appl. No.: 422,681

[22] Filed: Sep. 24, 1982

[30] Foreign Application Priority Data

Oct. 15, 1981 [GB] United Kingdom ............... 8131076

[51] Int. Cl.³ ............................................ F16F 15/28
[52] U.S. Cl. ............................. 123/192 B; 123/192 R; 74/603; 74/604
[58] Field of Search ........ 123/192 R, 192 B, 197 AC; 74/603, 604

[56] References Cited

U.S. PATENT DOCUMENTS

| | | | |
|---|---|---|---|
| 1,091,389 | 3/1914 | Reese et al. | 74/603 |
| 1,310,090 | 7/1919 | Ricardo | 74/604 |
| 1,794,715 | 3/1931 | Knight | 74/604 |
| 3,112,658 | 12/1963 | Berlyn | 123/192 B |
| 3,457,804 | 9/1967 | Harkness | 123/192 B |

Primary Examiner—Ira S. Lazarus
Assistant Examiner—R. S. Bailey
Attorney, Agent, or Firm—Gifford, VanOphem, Sheridan, Sprinkle & Nabozny

[57] ABSTRACT

A reciprocating engine, preferably a high speed internal combustion engine, includes means for reducing vibration.

The engine has at least one piston, a connecting rod connected at one end to the piston and at the other end to a crankshaft. A pair of balancing links are pivotally mounted on the crankshaft and guide links constrain the balancing links to follow paths generally normal to the crankshaft axis and in opposition to the piston.

The guide links extend in opposite directions and are attached to the balancing links and to a fixed point to balance out the vibrational forces of the engine.

6 Claims, 5 Drawing Figures

MEANS FOR REDUCING VIBRATION IN RECIPROCATING ENGINES

This invention relates to means for reducing vibration in reciprocating engines, in particular, but not exclusively, high speed internal combustion engines.

In prior U.S. Pat. No. 3,457,804 there is described and claimed a reciprocating engine having a piston, a connecting rod and a crankshaft to which the connecting rod is attached, the crankshaft pivotally carrying a balancing link the movement of which is guided by a guide link to follow a path generally normal to the crankshaft axis and in opposition to the movement of the piston. The balancing link follows a generally rectilinear path but due to the use of a pivotal guide link the path is in fact arcuate. If the guide link is relatively long the path approximates more to a rectilinear path but the use of a long guide link provides problems in accommodating the link and usually the engine crankcase needs to be extended for this purpose. Moreover if the guide link is relatively short excessive vibration forces of twice running frequency are introduced.

An object of the invention is to provide an improved reciprocating engine of the kind disclosed in said prior application in which the balancing link/guide link configuration is more compact without an increase of vibrational forces.

According to the invention a reciprocating engine comprises at least one piston, a connecting rod connected at one end to the piston, a crankshaft to which the other end of the connecting rod is attached, and a pair of balancing links constituting balancing weights and pivotally mounted on the crankshaft, the balancing links being constrained by a pair of guide links to follow paths generally normal to the axis of the crankshaft and in opposition to the movement of the piston, each guide link being associated with one of the balancing links and the guide links extending in opposite directions to one another for attachment at one end to the associated balancing link and at the other end to a fixed point.

Preferably the balancing links are located side by side on the crankshaft and the points of attachment of the guide links to the balancing links are at the centres of percussion of the balancing links. The centre of percussion is defined by its displacement from the centre of gravity of the balancing link which is a distance which is equal to the square of the polar radius of gyration of the balancing link divided by the distance between the centre of gravity of the balancing link and its point of attachment to the crankshaft.

By the use of a pair of balancing links each guided by a guide link extending in opposite directions to one another it is possible to use relatively short guide links because even though the balancing links depart from a rectilinear movement the out of balance inertia forces created are balanced out.

It will be appreciated that each balancing link balances one half of the reciprocating mass of the engine and the balancing arrangement balances the inertia forces of the piston and connecting rod.

Figure 2:
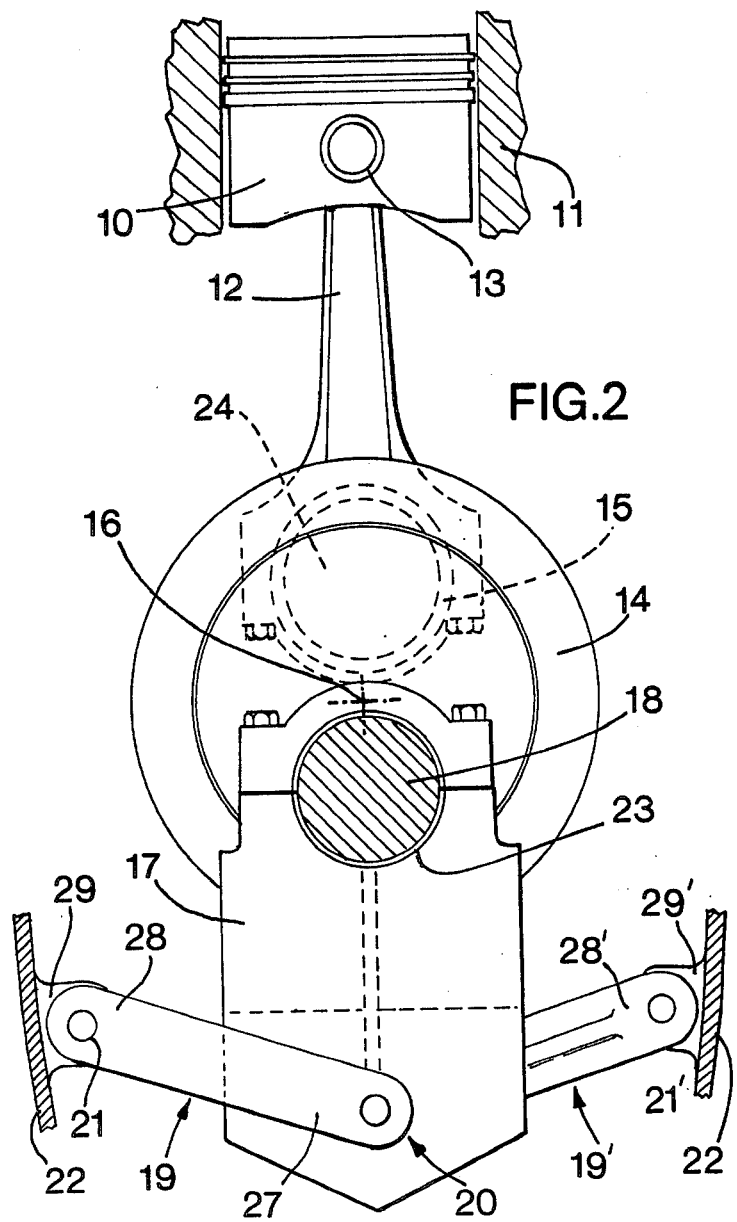
Figure 3:
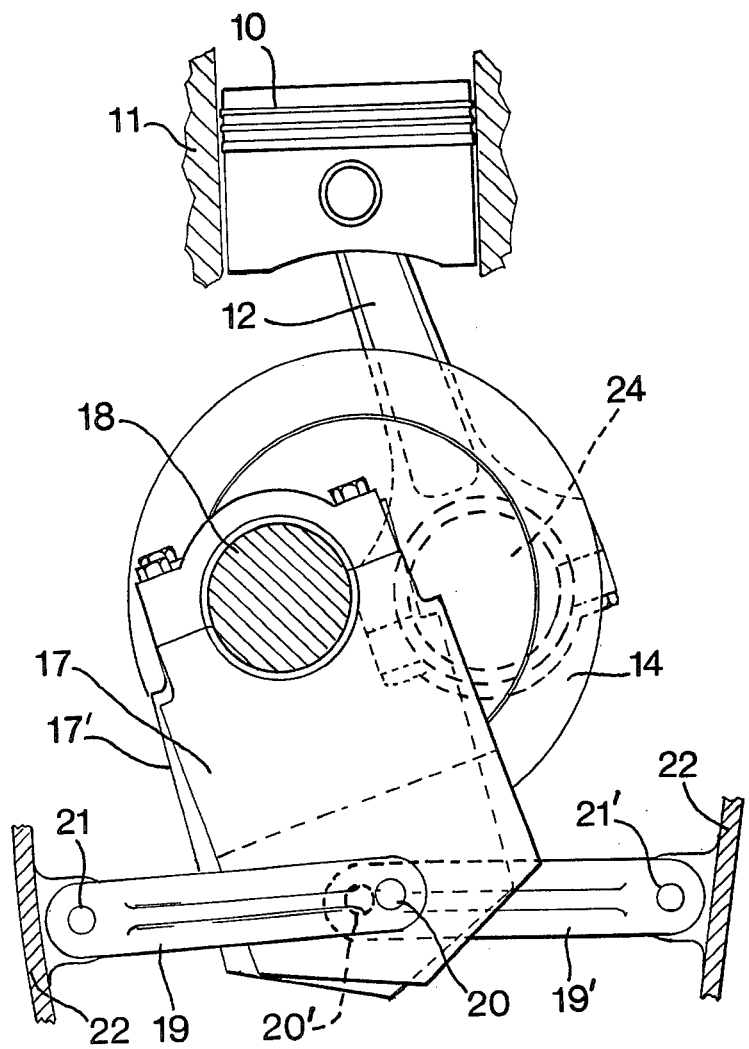
Figure 4:
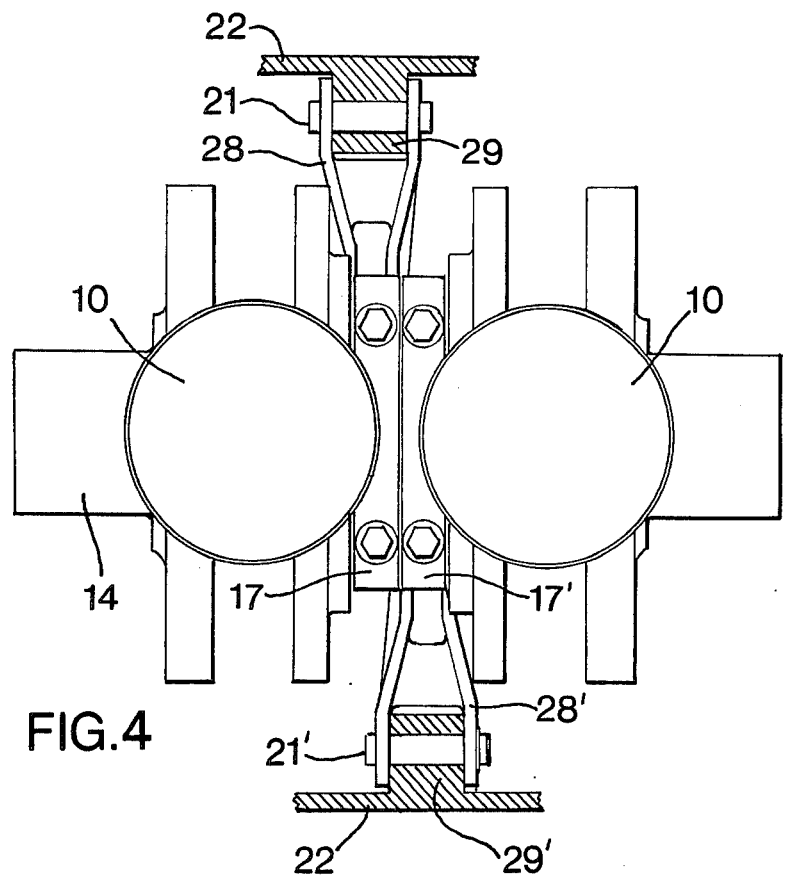
Figure 5:
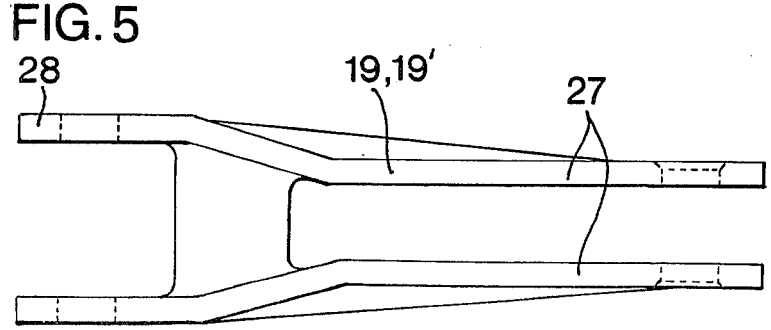

Further features of the invention will appear from the following description of an embodiment of the invention given by way of example only and with reference to the drawings, in which:

FIG. 1 is a schematic side elevation of part of a reciprocating engine in this case a parallel twin internal combustion engine, FIG. 2 is a section on the line A—A in FIG. 1, FIG. 3 is a section corresponding to that of FIG. 2 with the crankshaft displaced through 90° about its axis compared with the crankshaft position of FIG. 2, FIG. 4 is a plan view of the engine, and FIG. 5 is a plan view of a guide link of the engine of FIGS. 1-4.

Referring to the drawings an internal combustion engine is shown which in this case is a parallel twin engine but the invention could equally be applied to other reciprocating engines.

The engine includes a pair of pistons 10 movable to reciprocate in cylinders 11 and each piston is pivotally connected to a connecting rod 12 through a bearing 13. The other ends of the connecting rods 12 are connected to crankpins 24 on a crankshaft 14 through bearings 15.

A pair of balancing links 17 and 17' are pivotally attached to the crankshaft 14 through bearings 23, 23' onto a crankpin 18 located between the crankpins 24. The crankpin 18 is disposed at 180° around a pivot axis 16 of the crankshaft from the crankpins 24.

The balancing links 17 and 17' are pivotally attached to guide links 19 and 19' respectively by pivots 20 and 20'. The other ends of the guide links 19, 19' are pivotally attached to fixed pivots 21, 21' carried on the engine crankcase 22 so that the guide links extend in opposite directions from one another relative to the links 17 and 17'.

The guide links 19, 19' are located side by side on the crankpin 18 so that each is able to pivot independently of the other.

The pivots 20, 20' for the guide links include bearings (not shown) and pivot pins 26, 26'. Each guide link 19, 19' has bifurcated arms 27, 27' (FIG. 5) which locate to the sides of the associated balancing link 17, 17' and are apertured to receive the pins 26, 26'. The arms 27, 27' accommodate the associated balancing link as the crankshaft rotates and each guide link pivots relative to the associated balancing link. At the other end of each guide link 19, 19' the link is also bifurcated to provide arms 28, 28' which pass to either side of lugs 29, 29' on the crankcase 22 and the pivots 21, 21' are in the form of pins passing through the arms 28, 28' and the lugs 29, 29'.

The pivots 20, 20' by which the guide links 19, 19' are attached to the balancing links 17, 17' are located at the centres of percussion of the balancing links, the term 'centre of percussion' being as defined in our prior European application No. 81300671.5. Moreover the configuration of each balancing link/guide link combination is as described in said prior application. Thus the relationship between the connecting rod length and the effective lengths of the balancing links and the guide links is such that:

$$\frac{AB}{BC} \text{ is substantially equal to } \frac{DE}{DC}$$

where:

AB is the distance between the connection A of the connecting rod 12 to the piston 10 and the connection of the connecting rod 12 to the crankpin 24, BC is the distance between the axis 16 of the crankshaft 14 and the connection of the connecting rod 12 to the crankpin 24, DE is the distance between the connection 23 of the balancing links 17, 17' to the crankpin 18 and the connection 20 of the guide links 19, 19' to the balancing links 17, 17', and DC is the distance between the crankshaft axis 16 and the connection 23 of the balancing links 17, 17' to the crankpin 18.

In one important respect, however, the described arrangement is quite different from said prior specification. By the use of a pair of balancing links, and of guide links associated one with each balancing link and extending in opposite directions, each balancing link balances one half of the reciprocating mass of the engine and the components of inertia arising in a direction transverse to the movement of the reciprocating mass because the non-linear movement of the balancing link is balanced. Accordingly the lengths of the guide links are no longer material to the balancing action obtained and relatively shorter guide links can be used. In this way the balancing arrangement occupies less space in the engine configuration and the guide links can be accommodated in the crankcase without providing an extended crankcase profile.

In FIGS. 2 and 3 there are shown two positions adopted by the balancing link 17 during operation of the engine.

In FIG. 2 the pistons 10 are at the top of their strokes in the cylinders 11 (top dead centre position) and the balancing links are in their lowermost position. The pivotal axes of the pistons 10 to connecting rods 12, the crankpins 24 and the crankpins 18 are in alignment and aligned with the crankshaft axis 16. The same applies when the pistons 10 are at the bottom of their strokes (bottom dead centre position) except that the position of the crankpins 24 and 18 are reversed relative to the axis 16.

Intermediate these two positions, for example after the crankshaft has rotated through 90° from the bottom or top dead centre positions, as shown in FIG. 3 the crankpin 18 is displaced to the side of the plane in which the crankshaft axis and the piston lies and the connections 20, 20' of the guide links 19, 19' to the balancing links 17, 17' are displaced equal amounts to opposite sides of said plane. Thus the balancing links are displaced from the vertical in opposite directions in equal amounts thereby balancing the inertia components of the links 17 and 17'.

I claim:

1. A reciprocating engine comprising,
   at least one piston,
   a connecting rod connected at one end to the piston,
   a crankshaft,
   first crank pin means for rotatably supporting the connecting rod on the crankshaft about an axis displaced from the crankshaft axis,
   balancing links constituting balancing weights, and second crankpin means for rotatably supporting the balancing links on the crankshaft and displaced from the crankshaft axis
   the second crankpin means being located at 180° out of phase with the first crankpin means whereby the balancing links follow a path generally normal to the axis of the crankshaft and in opposition to the movement of the piston,
   wherein the balancing links include at least two balancing links supported on the second crankpin means, and a guide link for each balancing link, the guide links extending in opposite directions to one another for attachment to points fixed in relation to the engine crankcase whereby the balancing links move in opposite directions about the associated second crankpin means during rotation of the crankshaft.

2. A reciprocating engine according to claim 1 comprising an engine crankcase, the balancing links being contained within the crankcase.

3. A reciprocating engine according to claim 1 characterised in that the two balancing links are located side by side and closely adjacent one another on a common crankpin.

4. A reciprocating engine according to claim 1 wherein the effective lengths of the balancing links and guide links is such that AB/BC is substantially equal to DE/DC, where
   AB is the distance between the connection of the connecting rod to the piston and the connection of the connecting rod to the first crankpin means,
   BC is the distance between the axis of the crankshaft and the connection of the connecting rod to the first crankpin means,
   DE is the distance between the connection of the balancing links to the second crankpin means and the connection of the guide links to the balancing links, and
   DC is the distance between the crankshaft axis and the connection of the balancing links to the second crankpin means.

5. A reciprocating engine according to claim 1 wherein each balancing link balances one half of the reciprocating mass of the engine.

6. A reciprocating engine according to claim 1 characterised in that the engine is a parallel twin engine having a connecting rod for each piston, the connecting rods being attached to the crankshaft through first crankpins spaced apart from one another along the crankshaft, a second crankpin for the balancing links being located between the connecting rod crankpins.

* * * * *